3,023,188
ALCOHOLIC CARBON BLACK SLURRIES AND METHOD OF PREPARING RUBBER-CARBON BLACK MASTERBATCHES THEREWITH

Gerard Kraus and Joseph Dugone, Bartlesville, Okla., assignors to Phillips Petroleum Company, a corporation of Delaware
No Drawing. Filed Nov. 13, 1956, Ser. No. 621,527
16 Claims. (Cl. 260—41.5)

This invention relates to new carbon black slurries. In a further aspect, this invention relates to a new method of preparing rubber-carbon black masterbatches.

The preparation of carbon black slurries and the blending of them with natural or synthetic rubber latices to produce masterbatches is known. Carbon black slurries are generally prepared in an aqueous alkaline medium with the aid of a dispersing agent. In the methods of the prior art, after the addition of such a slurry to a rubber latex and thorough blending of the materials, it has been necessary to add a coagulant to cause precipitation of the carbon black along with the rubber. While such a method of operation is convenient and has much to be said in its favor, it has frequently been found that rubber produced by the latex masterbatching procedure is inferior to that obtained by mill mixing of the stock.

The difference is not too great but where the best possible properties are desired, mill mixing has been resorted to. The difference is demonstrated by the following data wherein a butadiene/styrene copolymer prepared by emulsion polymerization at 41° F. was compounded by each method. The rubber had a bound styrene content of 20 weight percent and a raw Mooney value (ML–4) of 52. The following compounding recipes were employed.

|  | Parts by weight | |
|---|---|---|
| Rubber or masterbatch | 140 | 100 |
| Carbon black (Philblack E) | | 40 |
| Zinc oxide | 3 | 3 |
| Sulfur | 1.75 | 1.75 |
| Circo-Para [1] | 3 | 3 |
| Stearic acid | 1 | 1 |
| Flexamine [2] | 1 | 1 |
| Santocure [3] | 1.4 | 1.3 |

[1] A blend containing equal parts of Circosol–2XH with Paraflux-Circosol–2XH: petroleum hydrocarbon softener containing hydrocarbon of high molecular weight, in the form of a heavy, viscous, transparent, pale green, odorless, liquid of low volatility; sp. gr., 0.940; Saybolt Universal Viscosity at 100° F., about 200 seconds. Paraflux: saturated polymerized hydrocarbon.

[2] A physical mixture containing 65 percent of a complex diarylamine-ketone reaction product and 35 percent of N,N'-diphenyl-p-phenylene diamine.

[3] N-cyclohexyl-2-benzothiazylsulfenamide.

The stocks were milled, cured 30 minutes at 307° F. and physical properties determined. Results were as follows:

|  | Master-batched stock | Mill mixed stock |
|---|---|---|
| Compression set, percent | 19.3 | 19.1 |
| 300% modulus, p.s.i | 1,040 | 1,140 |
| Tensile | 4,000 | 4,260 |
| Elongation, percent | 650 | 605 |
| ΔT °F | 63.5 | 64.2 |
| Resilience, percent | 59.5 | 57.5 |
| Abrasion loss, grams | 12.16 | 7.78 |
| Compounded MS-1-½ | 38.5 | 38 |

We have discovered that smooth, relatively non-viscous carbon black slurries are readily prepared by dispersing carbon black in alcohol, preferably containing a minor amount of an alkali metal hydroxide. The resulting slurry is employed in the production of rubber-carbon black masterbatches. When a slurry of this type is added to a natural or synthetic rubber latex, coagulation occurs without the addition of an additional coagulant and a rubber-carbon black masterbatch is obtained. The rubber produced using such carbon black slurries is equivalent in most properties to that produced by conventional mill mixing procedures.

The following are objects of our invention.

An object of this invention is to provide new carbon black slurries. A further object of our invention is to provide a slurry of carbon black in alcohol, the resulting slurry being of good consistency and stability. A further object is to provide a new method of preparing rubber-carbon black masterbatches.

Other objects and advantages of our invention will be apparent to one skilled in the art upon reading this disclosure.

Where the term rubber is used in this disclosure, we intend to include both natural and synthetic rubber, the synthetic rubber being the various types known in the art which are compounded with carbon black. The butadiene/styrene copolymers are probably best known but other diene polymers can be used to prepare suitable rubber copolymers such as butadiene/acrylonitrile, butadiene/vinylpyridine, isoprene/vinyl chloride, and the like being illustrative examples.

A new masterbatching process has now been discovered which is not only convenient but which will produce a rubber that is equivalent in most properties to that produced by conventional mill mixing procedures. This process comprises the preparation of an alcoholic slurry of carbon black, preferably containing a minor amount of an alkali metal hydroxide, followed by the rapid addition of this slurry, with rapid agitation, to a natural or synthetic rubber latex. The alcohol present in the slurry is sufficient to effect coagulation of the rubber. It is, therefore, not necessary to add a conventional coagulant such as brine and acid.

The alcoholic carbon black slurries of this invention are prepared using methyl, ethyl, n-propyl, and isopropyl alcohols. Small quantities of water can be present in the alcohol, and while up to ten weight percent can be tolerated, it is preferred that the amount not exceed five weight percent. It is preferred that a minor amount of an alkali metal hydroxide be present in the carbon black slurries. The presence of an alkali metal hydroxide gives a slurry of better consistency and greater stability than is obtained without it. The quantity of alkali metal hydroxide employed will depend upon the type of carbon black used, larger amounts being preferred with the higher surface area blacks but generally not more than five weight percent, based on the black, is employed.

The relative amounts of alcohol and carbon black in the slurry are adjusted so that when the masterbatch is prepared, it will contain the desired amount of carbon black and the alcohol present will be sufficient to effect complete coagulation of the rubber. The alcohol requirement can generally be decreased by creaming the latex prior to adding the carbon black slurry. The amount of alcohol and carbon black can readily be determined by a simple test with the particular latices. In general, slurries are prepared containing five to twenty-five weight percent black based upon the weight of the alcohol. The amount of alcohol used is roughly an amount equal in volume to the amount of latex but it is obvious that there are so many variables involved that an exact range would be of little help to those skilled in the art. For instance, the solids content of latices varies widely.

In connection with the data shown in this application, it will be appreciated by those skilled in the art that rubber test data vary widely depending upon the particular polymer. Furthermore, some variation is present in successive runs of the same polymer. In compounding rubber products, the manufacturer prepares a product having properties desired for a particular application. Frequently when one property is improved, there is some degradation of another property and a compounder prepares a product for a balance of physical properties more suitable for the particular use.

*Example I*

High abrasion furnace black (Philblack O) slurries containing ten weight percent solids were prepared using absolute ethyl alcohol and variable quantities of potassium hydroxide. Water was present in some samples. Two runs were made in the absence of potassium hydroxide. The slurries were prepared by mixing the ingredients in a Waring Blendor for two three-minute intervals separated by a five-minute rest period and viscosity measurements were then made using a Brookfield viscometer. Compositions of the slurries and their viscosities are shown below:

| Slurry No. | KOH weight percent | H$_2$O weight percent | Apparent Brookfield viscosity at 100 r.p.m., cps. |
|---|---|---|---|
| 1 | 0 | 0 | 64 |
| 2 | 0.2 | 0 | 50 |
| 3 | 0.2 | 1 | 56 |
| 4 | 0.2 | 5 | 66 |
| 5 | 1 | 0 | 52 |
| 6 | 1 | 1 | 56 |
| 7 | 1 | 5 | 64 |
| 8 | 5 | 0 | 54 |
| 9 | 5 | 1 | 65 |
| 10 | 5 | 5 | 77 |
| 11 | 0 | 1 | 76 |

Smooth, fluid slurries were obtained in the presence of alcoholic potassium hydroxide. While slurries can be prepared in the absence of potassium hydroxide, they are less stable than those in which the base is present.

Slurry No. 2 (200 grams) was added rapidly to the contents of one twelve-ounce bottle of ash-free GR-S latex (prepared using a volatile base soap and a volatile electrolyte). Coagulation occurred immediately and a good crumb which contained no loose carbon black was obtained.

*Example II*

Two runs were made for the copolymerization of butadiene with styrenes in aqueous emulsion at 41° F. and the latices were blended. The following recipes were employed.

| | Parts by weight | |
|---|---|---|
| | 1 | 2 |
| Butadiene | 72 | 72 |
| Styrene | 28 | 28 |
| Water | 180 | 180 |
| Rosin soap, potassium salt | 4.5 | 4.5 |
| KOH | 0.1 | 0.1 |
| KCl | 0.4 | 0.4 |
| Daxad 11 [1] | 0.1 | 0.1 |
| K$_4$P$_2$O$_7$ | 0.165 | 0.165 |
| FeSO$_4$.7H$_2$O | 0.139 | 0.139 |
| p-Menthane hydroperoxide | 0.095 | 0.095 |
| tert-Dodecyl mercaptan | 0.22 | 0.23 |
| Shortstop: Goodrite 3955 [2] | 0.15 | 0.15 |
| Antioxidant (parts per 100 parts rubber): Phenyl-beta-naphthylamine | 1.5 | 1.5 |
| Reaction time, hours | 15.3 | 18.0 |
| Conversion, percent | 61 | 60 |
| Mooney value (ML-4): | | |
| Stripped latex | 51 | 51 |
| Blend | 52 | 52 |
| Weight fraction in blend (on solids) | 0.622 | 0.378 |

[1] Sodium salt of condensed alkyl aryl sulfonic acid.
[2] 50/50 mixture of sodium dimethyldithiocarbamate and sulfur in the form of sodium polysulfide.

A portion of the butadiene/styrene latex was creamed using 50 cc. of saturated brine, diluted tenfold with water, per liter of latex. The creaming solution was added to the latex slowly under rapid agitation. Alcoholic potassium hydroxide slurries were prepared from the furnace blacks, Philblack E (super abrasion), Philblack I (intermediate super abrasion), and Philblack O (high abrasion), in the manner described in Example I. Masterbatches were prepared by rapid mixing of the creamed latex with each slurry. After coagulation occurred, the potassium hydroxide was neutralized with one normal hydrochloric acid and the crumb was washed repeatedly with warm water. The batches were dried for 48 hours at 50° C. in a vacuum oven. Quantities of materials for each of the slurries and the quantity of latex used in each masterbatch are shown below:

| | 1 | 2 | 3 |
|---|---|---|---|
| Ethanol, cc | 750 | 750 | 750 |
| KOH, grams | 1.20 | 1.00 | 0.75 |
| Philblack E, grams | 43.3 | | |
| Philblack I, grams | | 48.6 | |
| Philblack O, grams | | | 54.1 |
| Latex used, cc | 500 | 500 | 500 |
| Creaming solution, cc | 275 | 275 | 275 |

The masterbatches were designed to contain forty phr. (parts per 100 parts rubber) of Philblack E, forty-five phr. of Philblack I, and fifty phr. of Philblack O, respectively.

Two portions were prepared by the conventional masterbatching procedure. An aqueous slurry of Philblack O was employed which contained two parts by weight of potassium hydroxide per 100 parts of carbon black but no dispersing agent. The latex and carbon black slurry were blended and coagulation was effected by pouring the mixture into three times its volume of 0.5 percent sulfuric acid. The blend was stirred twelve minutes prior to coagulation in run 4 while in run 5, coagulation was effected within thirty seconds after blending the black slurry with the latex.

Analytical data on the five masterbatches are given in the following table:

| Run No. | Carbon black | | Analytical | | | | Bound rubber [1] per gram of Black |
|---|---|---|---|---|---|---|---|
| | Type | Phr. (nominal) | Percent black | Percent acid | Percent soap | Percent ash | |
| 1 | Philblack E | 40 | 29.1 | 0.63 | 0.05 | 0.18 | 0.592 |
| 2 | Philblack I | 45 | 31.7 | 0.39 | 0.06 | 0.23 | 0.485 |
| 3 | Philblack O | 50 | 32.5 | 0.22 | 0.04 | 0.18 | 0.429 |
| 4 | do | 50 | 31.1 | | | | 0.400 |
| 5 | do | 50 | 32.5 | 1.41 | 0.07 | 0.12 | 0.383 |

[1] Rubber not extracted by benzene (72 hours at 30° C.) following heat treatment three hours at 140° C. to gel rubber.

The five masterbatches were compounded, together with three mill mixed controls, in accordance with the following formulations:

|  | Run Nos. (parts by weight) | | | | | | | |
|---|---|---|---|---|---|---|---|---|
|  | 1 | 2 | 3 | 4 | 5 | 6 | 7 | 8 |
| Masterbatch or GR-S | 140 | 145 | 148 | 148 | 148 |  |  |  |
| Philblack E |  |  |  |  |  | 100 | 100 | 100 |
| Philblack I |  |  |  |  |  | 40 |  |  |
| Philblack O |  |  |  |  |  |  | 45 |  |
| Zinc oxide | 3 | 3 | 3 | 3 | 3 | 3 | 3 | 48 |
| Steric acid | 2 | 2 | 2 | 2 | 2 | 2 | 2 | 3 |
| Flexamine [1] | 1 | 1 | 1 | 1 | 1 | 1 | 1 | 2 |
| Sulfur | 1.75 | 1.75 | 1.75 | 1.75 | 1.75 | 1.75 | 1.75 | 1 |
| Santocure [2] | 1.25 | 1.25 | 1.25 | 1.25 | 1.25 | 1.25 | 1.25 | 1.75 |
|  |  |  |  |  |  |  |  | 1.25 |

[1] Physical mixture containing 65 percent of a complex diarylamineketone reaction product and 35 percent of N,N'-diphenyl-p-phenylenediamine.
[2] N-cyclohexyl-2-benzothiazylsulfenamide.

The stocks were milled, cured thirty minutes at 307° F., and physical properties determined. Results were as follows:

ALCOHOLIC KOH SLURRY

| Run No. | Carbon black | | 300% modulus, p.s.i. | Tensile, p.s.i. | Elongation, percent | Abrasion,[1] revolutions/mil |
|---|---|---|---|---|---|---|
|  | Type | Phr |  |  |  |  |
| 1 | Philblack E | 40 | 790 | 3,360 | 750 | 8.9 |
| 2 | Philblack I | 45 | 970 | 3,560 | 710 | 9.4 |
| 3 | Philblack O | 48 | 1,150 | 2,990 | 570 | 9.5 |

AQUEOUS KOH SLURRY

| 4 | Philblack O | 48 | 1,120 | 2,870 | 590 | 7.2 |
| 5 | do | 48 | 1,250 | 3,330 | 640 | 8.2 |

MILL MIXED CONTROLS

| 6 | Philblack E | 40 | 850 | [2] 2,590 | 600 | 9.1 |
| 7 | Philblack I | 45 | 960 | [2] 2,220 | 500 | 9.2 |
| 8 | Philblack O | 48 | 1,270 | 2,640 | 500 | 10.9 |

[1] No. 2½ Garnet paper; samples extracted with ethanol-toluene azeotrope. National Bureau of Standards Abrader.
[2] Values lower than normally expected for this type of compound.

*Example III*

Another portion of the butadiene/styrene latex described in Example II was creamed using 50 cc. of saturated brine, diluted tenfold with water, per liter of latex. The creaming solution was added to the latex slowly under rapid agitation. An alcoholic potassium hydroxide slurry of Philblack O (high abrasion furnace black) was prepared using ingredients in the following proportions:

| Ethanol | cc | 1500 |
| KOH | grams | 1.5 |
| Philblack O |  | 108.2 |

The slurry was prepared by mixing the materials in a Waring Blendor for two three-minute intervals separated by a two-minute rest period. A masterbatch was prepared by the rapid addition, with stirring, of the carbon black slurry to the latex (one liter of latex plus 550 cc. of creaming solution). The potassium hydroxide was neutralized with hydrochloric acid and the crumb was washed with water and dried as described in Example II. The masterbatch contained 46.5 parts by weight of carbon black per 100 parts rubber. It was compounded in a tread recipe. One run was made in which the carbon black was added to the rubber on the mill (dry mix control). Formulation was as follows:

|  | Parts by weight | |
|---|---|---|
|  | Dry mix control | Masterbatch |
| Rubber or masterbatch | 100 | 146.5 |
| Carbon black (Philblack O) | 46.5 |  |
| Zinc oxide | 3 | 3 |
| Sulfur | 1.75 | 1.75 |
| Stearic acid | 2 | 2 |
| Flexamine [1] | 1 | 1 |
| Circo-Para [2] | 5 | 5 |
| Santocure [1] | 1.1 | 1.1 |

[1] As in Example I.
[2] A blend of equal parts by weight of Circosol-2XH with Para Flux. Circosol 2=H: Petroleum hydrocarbon softener, containing hydrocarbons of high molecular weight, in the form of a heavy, viscous, transparent, pale green, odorless liquid of low volatility; sp. gr., 0.940; Saybolt universal viscosity at 100° F., about 2,000 seconds. Para Flux: Saturated polymerized hydrocarbon.

The stocks were milled, cured 30 minutes at 307° F., and physical properties determined. The following results show that the two stocks are comparable in most physical properties:

|  | Dry mix control | Masterbatch |
|---|---|---|
| Compression set, percent | 23.2 | 21.6 |
| 300% modulus, p.s.i., 80° F | 1,210 | 1,290 |
| Tensile, p.s.i., 80° F | 3,500 | 3,500 |
| Elongation, percent, 80° F | 580 | 600 |
| 200° F. Maximum tensile, p.s.i | 1,360 | 1,520 |
| ΔT° F | 65.9 | 66.9 |
| Resilience, percent | 61.4 | 62.1 |
| Shore hardness | 52 | 52.5 |
| Abrasion loss, grams | 9.09 | 9.25 |
| Compounded MS 1½ | 32 | 32.5 |
| Scorch at 280° F.: |  |  |
| Minimum Mooney | 31.5 | 31 |
| Minutes to scorch | 19.5 | 18.5 |

*Example IV*

Three carbon black slurries were prepared using the following proportions of ingredients:

|  | 1 | 2 | 3 |
|---|---|---|---|
| Philblack O, grams | 200 |  |  |
| Philblack I, grams |  | 180 |  |
| Philblack E, grams |  |  | 160 |
| Isopropyl alcohol, cc | 2,035 | 2,035 | 2,035 |
| KOH, grams | 2.79 | 3.71 | 4.33 |

The slurries were prepared by mixing the ingredients in a five quart Waring Blendor for two three-minute intervals separated by a five-minute rest period. Each slurry was added, with rapid agitation, to a sample of the butadiene/styrene latex described in Example II. The Philblack O masterbatch was heated to clear the serum but this step was not necessary in the other runs. The potassium hydroxide was neutralized with hydrochloric acid, the crumb was washed with water, and the rubbers were dried as described in Example II. The crumbs were fairly fine, were excellent in appearance, and exhibited non-crocking properties (the rubber left no stain when rubbed across paper). The masterbatches were designed to contain carbon black in the following proportions:

| | Parts by weight per 100 parts rubber |
|---|---|
| Philblack O | 50 |
| Philblack I | 45 |
| Philblack E | 40 |

A portion of the same rubber used for preparing the masterbatches was obtained by alcohol coagulation and used in mill mixed stocks for controls. Compounding formulations were as follows:

| | Parts by Weight | | | | | |
|---|---|---|---|---|---|---|
| | Masterbatches Stocks | | | Mill Mixed Controls | | |
| | 1 | 2 | 3 | 4 | 5 | 6 |
| Rubber or masterbatch | 145.98 | 144.23 | 139.28 | 100 | 100 | 100 |
| Philblack O | 4.02 | | | 50 | | |
| Philblack I | | | | | 45 | |
| Philblack E | | | 0.72 | | | 40 |
| Zinc oxide | 3 | 3 | 3 | 3 | 3 | 3 |
| Sulfur | 1.75 | 1.75 | 1.75 | 1.75 | 1.75 | 1.75 |
| Stearic acid | 2 | 2 | 2 | 2 | 2 | 2 |
| Flexamine [1] | 1 | 1 | 1 | 1 | 1 | 1 |
| Phenyl-beta-naphthylamine | 1 | 1 | 1 | 1 | 1 | 1 |
| Circo-Para [2] | 10 | 8 | 4 | 10 | 8 | 4 |
| Santocure [1] | 1.0 | 1.05 | 1.0 | 0.9 | 0.9 | 1.0 |
| Rubber [3] | | 0.77 | | | | |

[1] As in Example II.
[2] As in Example III.
[3] Alcohol coagulated rubber as used for mill mixed controls.

The stocks were milled, cured 30 minutes at 307° F., and physical properties determined. The following results show that the masterbatched stocks are comparable in most physical properties to the mill mixed stocks:

| | Masterbatches stocks | | | Mill mixed controls | | |
|---|---|---|---|---|---|---|
| | 1 | 2 | 3 | 4 | 5 | 6 |
| Unaged samples: | | | | | | |
| Compression set, percent | 18.1 | 18.9 | 18.4 | 18.9 | 19.0 | 18.3 |
| 300% modulus, p.s.i., 80° F | 1,150 | 920 | 790 | 1,075 | 990 | 890 |
| Tensile, p.s.i., 80° F | 3,325 | 3,740 | 4,420 | 3,480 | 3,810 | 4,750 |
| Elongation, percent, 80° F | 630 | 675 | 700 | 640 | 655 | 700 |
| 200° F. maximum tensile, p.s.i | 1,840 | 2,200 | 1,800 | 1,740 | 1,980 | 1,760 |
| Δ T° F | 64.5 | 67.6 | 64.2 | 67.6 | 68.9 | 66.6 |
| Resilience, percent | 62.8 | 62.1 | 62.1 | 64.4 | 61.9 | 61.5 |
| Shore hardness | 52.5 | 52 | 54 | 52 | 53.5 | 55 |
| Abrasion loss, grams | 10.10 | 9.93 | 8.94 | 10.63 | 8.71 | 8.30 |
| Compounded MS 1½ | 34.5 | 34 | 37 | 35 | 36 | 38.5 |
| Scorch at 280° F.: | | | | | | |
| Minimum Mooney | 31.5 | 33.5 | 38.5 | 33.5 | 36.5 | 42 |
| 5 point rise, min | 18 | 18.5 | 16.5 | 16.5 | 15 | 14.5 |
| Extrusion at 250° F.: | | | | | | |
| Inches per min | 42.0 | 37.0 | 30.0 | 37.8 | 34.8 | 28.5 |
| Grams per min | 90.3 | 84.5 | 79.3 | 84.5 | 82.5 | 85.3 |
| Oven aged 24 hours at 212° F.: | | | | | | |
| 300% modulus, p.s.i., 80° F | 2,010 | 1,800 | 1,620 | 1,975 | 1,880 | 1,810 |
| Tensile, p.s.i., 80° F | 3,120 | 3,420 | 4,450 | 3,190 | 3,875 | 4,320 |
| Elongation, percent, 80° F | 430 | 480 | 530 | 420 | 510 | 500 |
| Δ T° F | 55.8 | 58.1 | 56.8 | 57.8 | 57.8 | 56.1 |
| Resilience, percent | 67.5 | 66.1 | 65.3 | 68.2 | 65.8 | 65.0 |
| Abrasion loss, grams | 7.00 | 6.21 | 5.77 | 7.07 | 5.49 | 5.17 |

As many possible embodiments may be made of this invention without departing from the scope thereof, it is to be understood that all matter herein set forth is to be interpreted as illustrative and not in a limiting sense.

We claim:
1. The method of preparing a rubber-carbon black masterbatch comprising mixing a slurry of carbon black in a monohydric alcohol containing 1 to 3 carbon atoms with a rubber latex, the addition of said slurry causing coagulation of said rubber, the amount of black in said slurry being 5 to 25 weight percent based upon the weight of the alcohol.

2. The method of preparing a rubber-carbon black masterbatch comprising coagulating rubber latex, by adding a slurry of carbon black in a monohydric alcohol containing 1 to 3 carbon atoms, the amount of carbon black being sufficient to provide the desired black content in the rubber and the amount of alcohol being sufficient to effect complete coagulation of the rubber, said slurry containing 5 to 25 weight percent black, not more than ten weight percent water and a small quantity of an alkali metal hydroxide, the amount of alkali metal hydroxide not exceeding five weight percent, all weight percents being based on the alcohol.

3. The method of preparing a rubber-carbon black masterbatch comprising coagulating rubber latex by adding a slurry of carbon black in a monohydric alcohol of one to three carbon atoms, said slurry containing 5 to 25 weight percent black, not more than ten weight percent water and a small quantity of an alkali metal hydroxide, the amount of alkali metal hydroxide not exceeding five weight percent, all weight percents being based on the alcohol.

4. The method of claim 3 wherein said alcohol is methyl alcohol.

5. The method of claim 3 wherein said alcohol is ethyl alcohol.

6. The method of claim 3 wherein said alcohol is normal propyl alcohol.

7. The method of claim 3 wherein said alcohol is isopropyl alcohol.

8. The method of preparing a rubber-carbon black masterbatch comprising coagulating rubber latex by adding a slurry of carbon black in ethyl alcohol, said slurry containing potassium hydroxide in an amount not exceeding five percent by weight based on the alcohol and not more than five weight percent water based on the alcohol.

9. The method of preparing a rubber-carbon black masterbatch comprising coagulating rubber latex by adding a slurry of carbon black in isopropyl alcohol, said slurry containing potassium hydroxide in an amount not exceeding five weight percent based on the alcohol and not more than five weight percent water based on the alcohol.

10. A carbon black slurry, said slurry comprising carbon black in a monohydric alcohol of one to three carbon atoms, the amount of said carbon black being five to twenty-five weight percent, said slurry containing not more than ten weight percent water and an alkali metal hydroxide in an amount not exceeding five weight percent, all weight percents being based upon the alcohol.

11. The slurry of claim 10 wherein said alcohol is methyl alcohol.

12. The slurry of claim 10 wherein said alcohol is ethyl alcohol.

13. The slurry of claim 10 wherein said alcohol is normal propyl alcohol.

14. The slurry of claim 10 wherein said alcohol is isopropyl alcohol.

15. A carbon black slurry, said slurry comprising carbon black in ethyl alcohol, the amount of carbon black being five to twenty-five weight percent, said slurry containing potassium hydroxide in an amount not exceeding five weight percent and not more than five weight percent water, all weight percents being based upon the alcohol.

16. A carbon black slurry, said slurry comprising carbon black in isopropyl alcohol, the amount of carbon black being five to twenty-five weight percent, said slurry containing potassium hydroxide in an amount not exceeding five weight percent and not more than five weight percent water, all weight percents being based upon the alcohol.

References Cited in the file of this patent

UNITED STATES PATENTS

| | | |
|---|---|---|
| 2,046,757 | Tucker et al. | July 7, 1936 |
| 2,419,512 | Vesce | Apr. 22, 1947 |
| 2,684,958 | Hubbard et al. | July 27, 1954 |
| 2,719,092 | Grady | Sept. 27, 1955 |
| 2,793,134 | Williams | May 21, 1957 |
| 2,820,838 | Smith | Jan. 21, 1958 |

OTHER REFERENCES

Adams et al.: "Ind. and Eng. Chem.," volume 43, No. 3, March 1951, pages 754–765, 771–778.